(12) United States Patent
Carty et al.

(10) Patent No.: US 11,102,353 B2
(45) Date of Patent: Aug. 24, 2021

(54) VIDEO CALL ROUTING AND MANAGEMENT BASED ON ARTIFICIAL INTELLIGENCE DETERMINED FACIAL EMOTION

(71) Applicant: Avaya Inc., Santa Clara, CA (US)

(72) Inventors: Gerard Carty, County Galway (IE); Thomas Moran, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/405,023

(22) Filed: May 7, 2019

(65) Prior Publication Data

US 2020/0358900 A1 Nov. 12, 2020

(51) Int. Cl.
*H04M 3/523* (2006.01)
*G06K 9/00* (2006.01)
(Continued)

(52) U.S. Cl.
CPC ........ *H04M 3/523* (2013.01); *G06K 9/00315* (2013.01); *G10L 15/26* (2013.01); *H04N 7/147* (2013.01); *G06F 3/04842* (2013.01); *H04M 3/5166* (2013.01); *H04M 3/5175* (2013.01); *H04M 2203/406* (2013.01); *H04M 2203/551* (2013.01)

(58) Field of Classification Search
CPC ........... H04M 3/523; H04M 2203/402; H04M 2203/403; H04M 3/5175; G06K 9/00315
See application file for complete search history.

(56) References Cited

U.S. PATENT DOCUMENTS 7,627,475 B2   12/2009   Petrushin
8,098,273 B2 *  1/2012   Khouri ............... G06K 9/00315
                                                         348/14.1
(Continued)

FOREIGN PATENT DOCUMENTS

WO    WO 2017/210633    12/2017

OTHER PUBLICATIONS

Venneti, Revealing True Emotions Through Micro-Expressions: A Machine Learning Approach, 2018, SEI Blog (Year: 2018).*

(Continued)

*Primary Examiner* — Ahmad F. Matar
*Assistant Examiner* — Jirapon Intavong
(74) *Attorney, Agent, or Firm* — Sheridan Ross P.C.

(57) ABSTRACT

A video stream of a video call between a communication endpoint of customer and a communication endpoint of a contact center agent is received. The video stream of the video call is processed in real-time to generate a real-time emotion transcript. The real-time emotion transcript tracks a plurality of separate emotions based on non-verbal expressions (e.g. facial expressions) that occur in the video stream of the video call. For example, different emotions of both the customer and the contact center agent may tracked in the real-time emotion transcript. The real-time emotion transcript is compared to an emotion transcript of at least one previous video call to determine if the video call should be handled differently in the contact center. In response to determining that video call should be handled differently in the contact center, an action determined to change how the video call is managed in the contact center.

18 Claims, 5 Drawing Sheets

(51) Int. Cl.
    *G10L 15/26*    (2006.01)
    *H04N 7/14*     (2006.01)
    G06F 3/0484     (2013.01)
    H04M 3/51       (2006.01)

(56)         References Cited

U.S. PATENT DOCUMENTS 9,299,343  B1     3/2016   Koster et al.
    9,600,715  B2     3/2017   Natan et al.
    9,818,024  B2    11/2017   Bacivarov et al.
   10,069,971  B1 *   9/2018   Shaw ................. H04M 3/5133
 2008/0068397  A1     3/2008   Carey et al.
 2010/0278318  A1    11/2010   Flockhart et al.
 2014/0140497  A1     5/2014   Rippa et al.
 2015/0286858  A1 *  10/2015   Shaburov ............. G06K 9/6209
                                                           382/103
 2017/0364741  A1 *  12/2017   Hau ........................ G06K 9/72

OTHER PUBLICATIONS

Matsumoto et al. "Reading facial expressions of emotion," American Psychological Association, May 2011, 9 pages [retrieved online from: www.apa.org/science/about/psa/2011/05/facial-expressions].
Seng et al. "Video Analytics for Customer Emotion and Satisfaction at Contact Centers," IEEE Transactions on Human-Machine Systems, Jun. 2018, vol. 48, No. 3, pp. 266-278 (Abstract Only).
Extended Search Report for European Patent Application No. 20173195.7, dated Sep. 8, 2020 9 pages.
Official Action for India Patent Application No. 202014017924, dated Mar. 31, 2021 7 pages.

* cited by examiner

VIDEO CALL ROUTING AND MANAGEMENT BASED ON ARTIFICIAL INTELLIGENCE DETERMINED FACIAL EMOTION

BACKGROUND

Understanding the feelings of someone we are communicating is a very important part of building a relationship with that person. The process of understanding how a person feels is something that comes with time and in many cases comes from being able to understand non-verbal 'hints' the other person gives. Some of these non-verbal 'hints' are difficult to detect, even over time. In addition, some non-verbal 'hints' may be undetectable by a human even when a human knows what to look for. For example, the Psychological Science Agenda, "Reading facial expressions of emotion," by David Matsumoto and Hyi Swang Hwang, May 2011 (https://www.apa.org/science/about/psa/2011/05/facial-expressions.aspx), which is incorporated herein in its entirety by reference, discusses what are called micro-expressions. Micro-expressions "are expressions that go on and off the face in a fraction of a second, sometimes as fast as $\frac{1}{30}$ of a second . . . . They occur so fast that most people cannot see or recognize them in real time" (See Id.).

In a contact center, it is even more difficult to pick up on these non-verbal 'hints'. For example, a contact center agent may be talking to a customer for the first time, there may be cultural differences involved, and/or the like. In addition, because of framing rates, compression ratios, limited bandwidth, congestion (i.e., lost packets), and/or the like, micro-expressions may be completely undetectable without the aid of a video processor to detect the subtle micro-expressions. Failure of a contact center agent to understand the non-verbal "hints" of the emotional state of the customer can lead to increased customer dissatisfaction, increased call times, lost revenue, a dissatisfied workforce, less efficient contact centers, etc

SUMMARY

These and other needs are addressed by the various embodiments and configurations of the present disclosure. A video stream of a video call between a communication endpoint of a customer and a communication endpoint of a contact center agent is received. The video stream of the video call is processed in real-time to generate a real-time emotion transcript. The real-time emotion transcript tracks a plurality of separate emotions based on non-verbal expressions (e.g. micro-expressions) that occur in the video stream of the video call. For example, different emotions of both the customer and the contact center agent may tracked in the real-time emotion transcript. The real-time emotion transcript is compared to an emotion transcript of at least one previous video call to determine if the video call should be handled differently in the contact center. In response to determining if that video call should be handled differently in the contact center, an action is determined to change how the video call is managed in the contact center. For example, the video call may be rerouted in the contact center to a contact center queue, a communication endpoint of another contact center agent or a supervisor, and/or the like.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35

U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "customer" as defined herein an in the claims can be any human person who has a video call with a contact center, communication system, and/or with another party.

As described herein and in the claims, the term "re-routing" of a video call can be or may include any scenario where connection characteristics of the video call change. Re-routing comprises joining another communication endpoint to the video call, a change of medium (e.g., from a video call to an audio only call), routing the voice call to another device or element (e.g., a contact center queue, an Interactive Voice Response (IVR), another agent communication endpoint, another contact center, and/or the like), placing the video call on hold, muting the video call, and/or the like. All of the above types of re-routing may be accomplished automatically.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
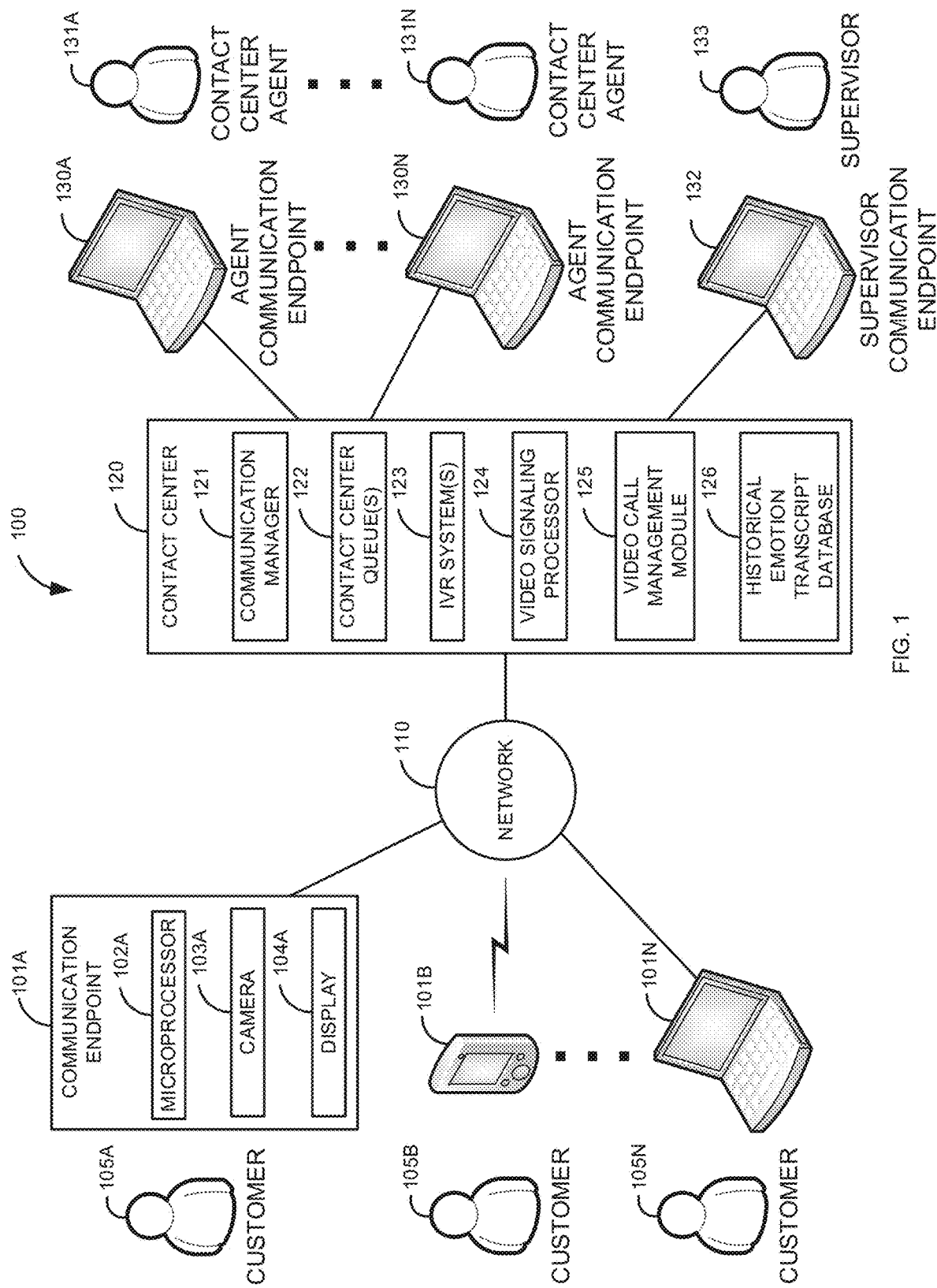
FIG. 1 is a block diagram of a first illustrative system for managing a video call based on real-time video processing to detect facial emotion emotions in a video stream of the video call.

FIG. 1 is a block diagram of a first illustrative system 100 for managing a video call based on real-time video processing to detect facial emotion emotions in a video stream of the video call. The first illustrative system 100 comprises communication endpoints 101A-101N, a network 110, a contact center 120, agent communication endpoints 130A-130N, and a supervisor communication endpoint 132. In addition, FIG. 1 shows customers 105A-105N, contact center agents 131A-131N, and a supervisor 133.

The communication endpoints 101A-101N can be or may include any communication endpoint device that supports video communications and can communicate on the network 110, such as a Personal Computer (PC), a videophone, a video system, a cellular telephone, a Personal Digital Assistant (PDA), a tablet device, a notebook device, a smartphone, and/or the like. The communication endpoints 101A-101N are devices where a communication session ends. The communication endpoints 101A-101N are not network elements that facilitate and/or relay a communication session in the network, such as a communication manager 121 or router. As shown in FIG. 1, any number of communication endpoints 101A-101N may be connected to the network 110.

The communication endpoint 101A comprise a microprocessor 102A, a camera 103A, and a display 104A. Although not shown for convenience, the communication endpoints 101B-101N also comprise a microprocessor 102, a camera 103, and a display 104.

The microprocessor 102A can be or may include any hardware processor, such as, a Digital Signaling Processor (DSP), a microcontroller, a multi-core processor, an Application Specific processor, and/or the like.

The camera 103A can be or may include any hardware element that can be used to capture a video stream. The camera 103A comprises a video application that that sends a video stream of a video call.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Integrated Services Digital Network (ISDN), video protocols, and/or the like. Thus, the network 110 is an electronic communication network configured to carry messages via packets and/or circuit switched communications.

The contact center 120 can be or any include any contact center 120 that can manage and route communications to and from the communication endpoints 101A-101N, the agent communication endpoints 130A-130N, and the supervisor communication endpoint 132. The contact center 120 can manage and route various types of communication, such as, video calls, audio calls, Instant Messages, emails, text messages, virtual reality calls, multimedia calls, and/or the like.

The contact center 120 comprises a communication manager 121, contact center queue(s) 122, Interactive Voice Response (IVR) system(s) 123, a video signaling processor 124, a video call management module 125, and a historical emotion transcript database 126. The communication manager 121 can be or may include any hardware coupled with software that can route and manage communications in the contact center 120, such as, a Private Branch Exchange (PBX), a session manager, a switch, a proxy server, and/or the like. The communication manager 121 can manage and route various types of communications, such as, voice calls, video calls, Instant Messaging calls, emails, text messages, and/or the like.

The contact center queue(s) 122 are a computer construct (s) that hold one or more communications/calls. The contact center queue(s) 122 may hold the same types of communications or different types of communications (e.g., voice and video calls). A contact center queue 122 may support a specific type of service, a specific product, a level of expertise (e.g., a front-line support/back line support for a specific product or service), and/or the like.

The IVR system(s) 123 can be or may include any hardware coupled with software that can provide either voice or video/voice interaction with a customer 105. The IVR system(s) 123 allows a customer 105 to be directed to various contact center queue(s) 122/agent communication endpoints 130A-130N.

The video signaling processor 124 can be or may include any hardware coupled with software that can process a video stream (e.g., a real-time video stream), such as, a digital signaling processor, a multi-core processor, an application specific processor, and/or the like. The video signaling processor 124 processes a real-time video stream (e.g., between the communication endpoint 101A and the agent communication endpoint 130A) to identify non-verbal expressions (e.g., a participant that is smiling) in the video stream for any number of participants. The video stream may be a video conference call with three or more customers 105/contact center agents 131/supervisor(s) 133. The video signaling processor 124 may process a video stream of a customer 105 when the customer 105 is connected to a non-human entity. For example, the video signaling processor 124 can identify non-verbal expressions while the customer 105 is interacting with the IVR system 123 (a video IVR system 123 in this instance) or waiting in a contact center queue 122.

The video signaling processor 124 identifies the non-verbal expressions within the video stream for some or all of the participants in a video call. Non-verbal expressions can be detected for all types of emotions, such as, anger, contempt, disgust, fear, joy, sadness, surprise, and/or the like. Research studies by behavioral scientists have demonstrated that there is strong evidence for agreement across cultures from all over the world that essentially the same facial expressions are used to express the seven emotions: anger, contempt, disgust, fear, joy, sadness, and surprise. It has also been shown that individuals who have been born without eyesight produce the same facial expressions as individuals with normal eyesight. Emotional states naturally occur for ½ second to about 4 seconds and are called macro-expressions.

Another important discovery by behavioral scientists are micro-expressions. Micro-expressions are facial expressions which pop on or off the face in fraction of a second. Typically, a micro-expression occurs for a duration of about 1/30 of a second and may not even be observable by someone watching for facial expressions. Some scientists believe such micro-expressions cannot be directly controlled by an individual. It is also likely that micro-expressions may reveal unconscious emotional states or emotional states that an individual wishes to conceal. The video signaling processor 124 can detect both macro-expressions and micro-expressions, which are both forms of non-verbal expressions.

Based on the detected non-verbal expressions in the video stream, the video signaling processor 124 generates one or more real-time emotion transcripts. The real-time emotion transcripts track individual emotions to form a set of emotions for an individual participant (e.g., the customer 105) in the video call. The video signaling processor 124 can generate a separate real-time emotion transcript for each participant in the video call (or for a subset of participants).

The video call management module 125 works in conjunction with the video signaling processor 124/communication manager 121. The video call management module 125 uses defined rules in conjunction with the generated real-time emotion transcripts to manage various aspects of the video call in real-time. The video call management module 125 may also include an Artificial Intelligence (AI) module that can learn over time how to better manage video calls by using emotion transcripts of prior video calls that are stored in the historical emotion transcript database 126.

The historical emotion transcript database 126 can be or may include any type of database, such as, a relational database, a file system, a directory service, an object oriented database, and/or the like. The historical emotion transcript database 126 is used to store emotion transcripts from prior video calls that can be retrieved by the video call management module 125 to help with decisions on how to better manage a live real-time video call.

The agent communication endpoints 130A-130N, can be any communication device that allows the contact center agents 131A-131N to interact in a video call. The agent communication endpoints 130A-130N may be a communication endpoint 101.

The supervisor communication endpoint 132 is a communication endpoint 101 that is used by a supervisor 133 to manage video calls in the contact center 120. The supervisor 133 may use the supervisor communication endpoint 132 to monitor a video call, join a video call, view statistics, and/or the like.

Although FIG. 1 shows the video signaling processor 124/video call management module 125 in the contact center 120, in another embodiment, the video signaling processor 124/video call management module 125 may be distributed between the contact center 120 and one or more communication endpoints 101/130.

In another embodiment, the video signaling processor 124/video call management module 125 may work in a non-contact center environment. For example, the video signaling processor 124/video call management module 125 may be located on a server or in a communication endpoint 101. Alternatively, the video signaling processor 124/video call management module 125 may be distributed between a communication endpoint(s) 101 and a non-contact center element, such as a communication system.

Figure 2:
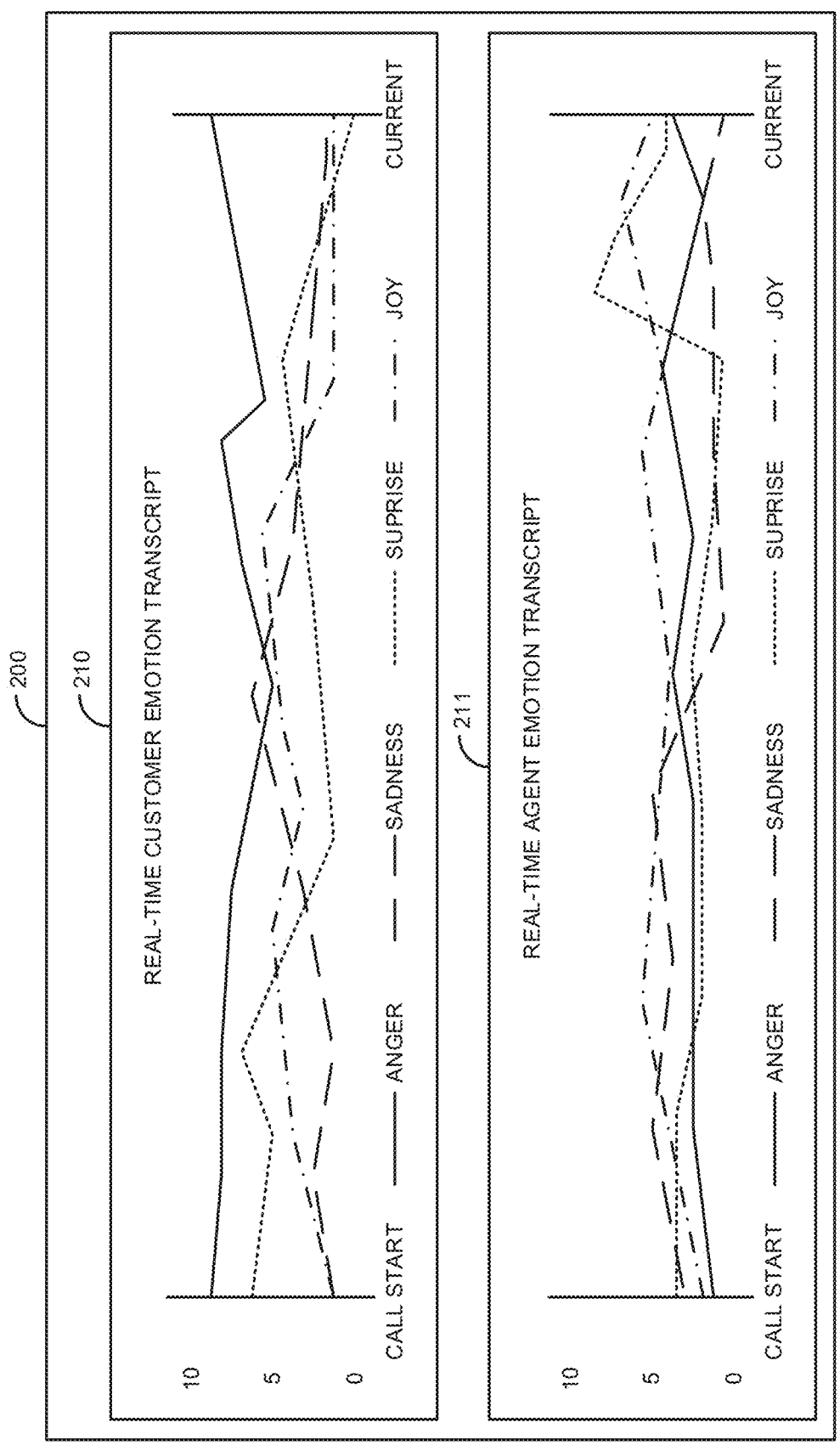
FIG. 2 is an exemplary user interface that shows real-time emotion transcripts for a video call between a customer and a contact center agent.

FIG. 2 is an exemplary user interface 200 that shows real-time emotion transcripts 210/211 for a video call between a customer 105 and a contact center agent 131. Illustratively, the communication endpoints 101A-101N, the contact center 120, the communication manager 121, the contact center queue(s) 122, the IVR system(s) 123, the video signaling processor 124, the video call management module 125, the historical emotion transcript database 126, the agent communication endpoints 130A-130N, and the supervisor communication endpoint 132 are stored-program-controlled entities, such as a computer or microprocessor, which performs the methods of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The user interface 200 is an exemplary user interface that is displayed to a contact center agent 131 via the agent communication endpoint 130. The user interface 200 may be displayed in real-time so that the contact center agent 131 is aware of not only his/her emotional state, but is also be aware of the emotional state of the customer 105. The user interface 200 comprises a real-time customer emotion transcript 210 and a real-time agent emotion transcript 211 of a live real-time video call. The real-time customer emotion transcript 210/real-time agent emotion transcript 211, in this example, show only four emotions (out of seven): anger, sadness, surprise, and joy. However, the real-time customer emotion transcript 210/real-time agent emotion transcript 211 may show any number of emotions. If the video call includes multiple customers 105, the user interface 200 can show a real-time customer emotion transcript 210 for each customer 105 on the video call.

The real-time customer emotion transcript 210/real-time agent emotion transcript 211 shows real-time transcripts 210/211 of the whole video call. However, in other embodiments, the real-time customer emotion transcript 210/real-time agent emotion transcript 211 may be a rolling transcript (e.g., of the last five minutes).

In one embodiment, only one of the real-time customer emotion transcript 210 or the real-time agent emotion transcript 211 may be shown at the same time. For example, the contact center agent 131 may only see the real-time customer emotion transcript 210.

Figure 3:
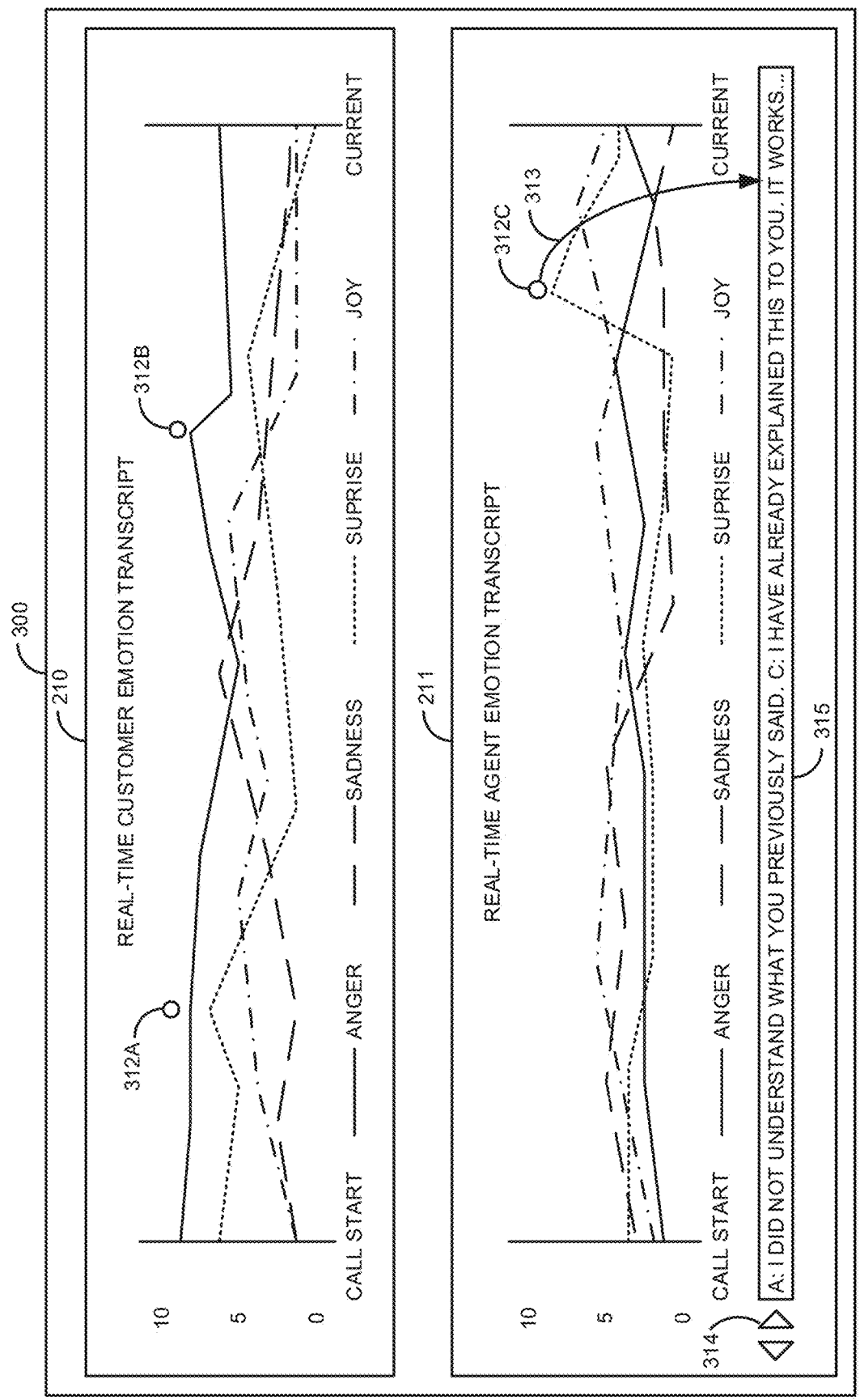
FIG. 3 is an exemplary user interface that shows real-time emotion transcripts for a video call between a customer and a contact center agent that are displayed to a supervisor.

FIG. 3 is an exemplary user interface 300 that shows real-time emotion transcripts 210/211 for a video call between a customer 105 and a contact center agent 131 that are displayed to a supervisor 133. However, in one embodiment, the user interface 300 may be displayed to a contact center agent 131. The user interface 300 comprises the real-time customer emotion transcript 210 and the real-time agent emotion transcript 211. The user interface 300 can be displayed to the supervisor 133 based on various criteria. For example, the user interface 300 may be displayed to the supervisor 133 when a video call is transferred to the supervisor 133, when the supervisor 133 joins the video call, when the supervisor 133 wants to monitor the real-time emotion transcripts 210/211 of a video call, and/or the like.

The real-time customer emotion transcript 210 further comprises change point markers 312A and 312B. In addition, the real-time agent emotion transcript 211 comprises the change point marker 312C. The change point markers 312 identify points in the real-time video call where the customer 105 and/or the contact center agent 131 has had a change in an emotional state (positive/negative). The change point marker 312A identifies where the customer's surprise emotion has changed. The change point marker 312B identifies where the customer's anger emotion has increased to a specific level. The change point marker 312C identifies where the contact center agent's surprise emotion has significantly changed.

The video call management module 125 can use various rules to determine when to show a change point marker 312 in the user interface 300. For example, a change point marker 312 may be shown when a specific emotion has reached a specific level. The video call management module 125 may use prior emotion transcripts (in addition or separate from the rules) to determine when to show a change point marker(s) 132. For example, if the contact center agent 131 has rarely shown a change in the surprise emotion in agent emotion transcripts for previous video calls, the dramatic change in the surprise emotion in the real-time agent emotion transcript 211 may be a means for generating the change point marker 312C.

The supervisor 133 can the select one of the change point markers 312A-312C (e.g., by clicking on the change point marker 312). For example, the supervisor 133, as shown in step 313, has selected the change point marker 312C. The selection of the change point marker 312C causes a portion of a text transcript of the real-time video call to be displayed (e.g., the last two minutes before the surprise emotion of the contact center agent 131 peaked) to the supervisor 133 in a text transcript window 315. The supervisor 133 can then use a forward/back button 314 to scroll forward and backward in the text transcript of the live video call.

Figure 4:
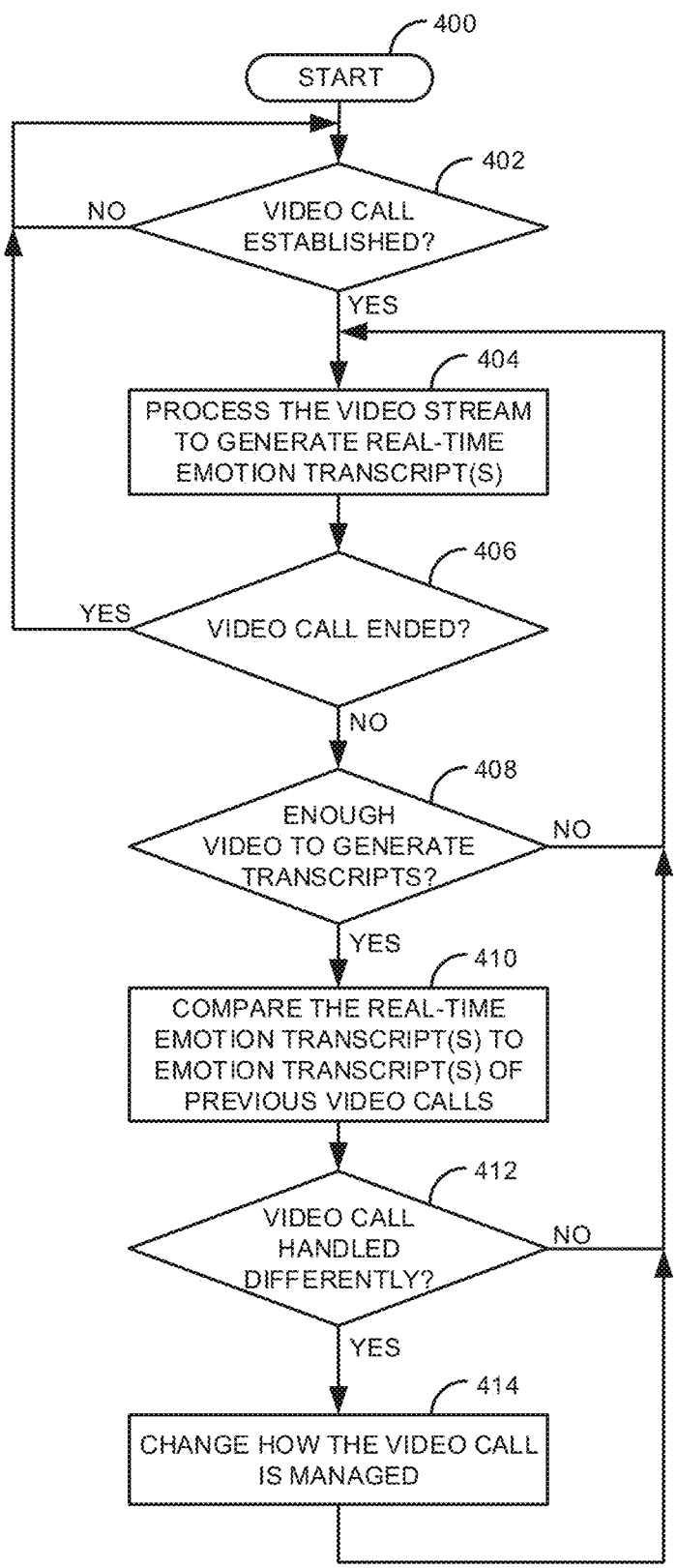
FIG. 4 is a flow diagram of a process for managing a video call based on facial emotion detection.

FIG. 4 is a flow diagram of a process for managing a video call based on facial emotion detection. The process starts in step 400. The communication manager 121 determines, in step 402, if a video call (or conference video call) has been established in step 402. If a video call has not been established in step 402, the process of step 402 repeats.

Otherwise, if a video call has been established in step 402, the video signaling processor 124 processes the video stream, in step 404, to start generating the real-time emotion transcript(s) 210/211. For example, the video signaling processor 124 may generate the real-time customer emotion transcript 210 and the real-time agent emotion transcript 211 based on machine learning algorithms such as K-Means clustering in conjunction with Stochastic Neighborhood Embedding, which can be trained to identify emotions based on the macro-expressions/micro-expressions.

Alternatively, only a single emotion transcript 210/211 may be generated in step 404. For example, only the real-time customer emotion transcript 210 may be generated because the customer 105 has only interacted with an IVR system 123 or because the rules only dictate generation of the real-time customer emotion transcript 210.

In one embodiment, a composite real-time emotion transcript may be generated in step 404. The composite real-time emotion transcript is a composite emotion transcript of two or more of the participants in the video call. For example, the composite emotion transcript may be a composite of the real-time emotion transcripts 210/211.

The real-time emotion transcripts 210/211 and/or composite emotion transcript are generated using macro-expressions and/or micro-expressions. As discussed above in the background section, micro-expressions may be undetectable by a human without the aid of a microprocessor. This is due to the extremely short duration and/or because of issues associated with capturing a video stream and sending the video stream across the network 110. In one embodiment, emotion information from other sources may be captured and used as additional input to generate the real-time emotions transcripts 210/211 and/or composite emotion transcript. For example, gestures may be detected, voice emotion may be detected, and/or the like to help enhance the real-time emotions transcripts 210/211 and/or composite emotion transcript.

The communication manager 121 determines, in step 406, if the video call has ended. If the video call has ended in step 406, the process goes back to step 402. Otherwise, if the video call has not ended in step 406, the video signaling processor 124 determines, in step 408, if there is enough video in the video stream to generate the real-time emotion transcripts 210/211 and/or composite real-time emotion transcript. For example, the video signaling processor 124 may need a short period of time in order to identify macro-expressions/micro-expressions in the video stream in order to generate the real-time emotion transcripts 210/211 and/or composite real-time emotion transcript. The time needed to determine if there is enough video may be based on various rules.

If there is not enough video in the video stream to generate the real-time emotion transcripts 210/211 and/or composite real-time emotion transcript, the process goes back to step 404. Otherwise, if there is enough video to generate the real-time emotion transcripts 210/211 and/or composite real-time emotion transcript in step 408, the video call management module 125 compares, in step 410, the real-time emotion transcripts 210/211 and/or composite real-time emotion transcript to emotion transcripts of previous video calls.

The video call management module 125 can compare the real-time emotion transcripts 210/211 and/or composite real-time emotion transcript to the emotion transcripts of previous video calls in various ways. For example, the video call management module 125 may compare the real-time customer emotion transcript 210 to customer emotion transcripts of different customers 105 in prior video calls. The video call management module 125 may compare the real-time customer emotion transcript 210 to a previous customer emotion transcript for the same customer 105.

The video call management module 125 may compare the real-time composite emotion transcript with a composite emotion transcript(s) of prior video call(s) in step 410. The video call management module 125 may compare multiple emotion transcripts with each other in step 410. For example, the video call management module 125 may compare the real-time customer emotion transcript 210 to prior customer emotion transcript(s) along with comparing the real-time agent emotion transcript 211 to prior agent emotion transcript(s).

The comparison of step 410 may be based on comparing video calls of a specific type. For example, comparison of the emotion transcripts may be for video calls associated with service provided by the contact center 120, associated with a contact center queue 122, associated with a supported product, associated with a skill of a contact center agent 131 (e.g., a higher skill level), and/or the like.

The video call management module 125 determines if the video call needs to be handled differently in step 412 based on the comparison of step 410. For example, if the real-time customer emotion transcript 210 has a similar pattern to prior customer emotion transcripts (e.g., the customer 105 is showing a high level of anger and sadness along with low levels of joy) where the customer 105 typically hung up the prior video call(s), the video call management module 125 may determine to provide feedback to the contact center agent 131, transfer the video call (e.g., to a different agent that does not emotionally react in the same manner), join a supervisor onto the video call, and/or the like. If the real-time customer emotion transcript 210 has a pattern that is similar to customer emotion transcripts of prior calls where positive feedback was received, the video call management module 125 may decide to not handle the video call differently in step 412. For example, if the real-time customer emotion transcript for the identified prior video calls showed that the customer 105 is likely to be happy, the video call management module 125 may decide to not manage the video call differently in step 412.

The video call management module 125 can determine similar patterns between emotion transcripts in various ways. For example, a variance may be used (e.g. an individual emotion is within 10%). The variance may be a composite variance between the plurality of emotions being tracked.

If the video call is not to be handled differently in step 412, the process goes to step 404. Otherwise, if the video call is to be handled differently in step 412, the video call management module 125 changes how the video call is managed in the contact center 120 in step 414. The video call can be managed in various ways. For example, the video call can be re-routed by: joining a supervisor communication endpoint 132 to the video call, routing the video call to a second communication endpoint 101 of a second contact center agent 131, routing the video call to an Interactive Voice Response (IVR) system 123, routing the video call to a contact center queue 122, routing the video call to a second contact center 120, placing the video call on hold or mute, changing a media of the video call, and/or the like. The video call may be managed by sending a message to the contact center agent 131, flagging and storing the real-time customer emotion transcript 210 and/or the real-time agent emotion transcript 211 in a database, and/or the like. After the video call is managed in step 414, the process goes to step 404.

Figure 5:
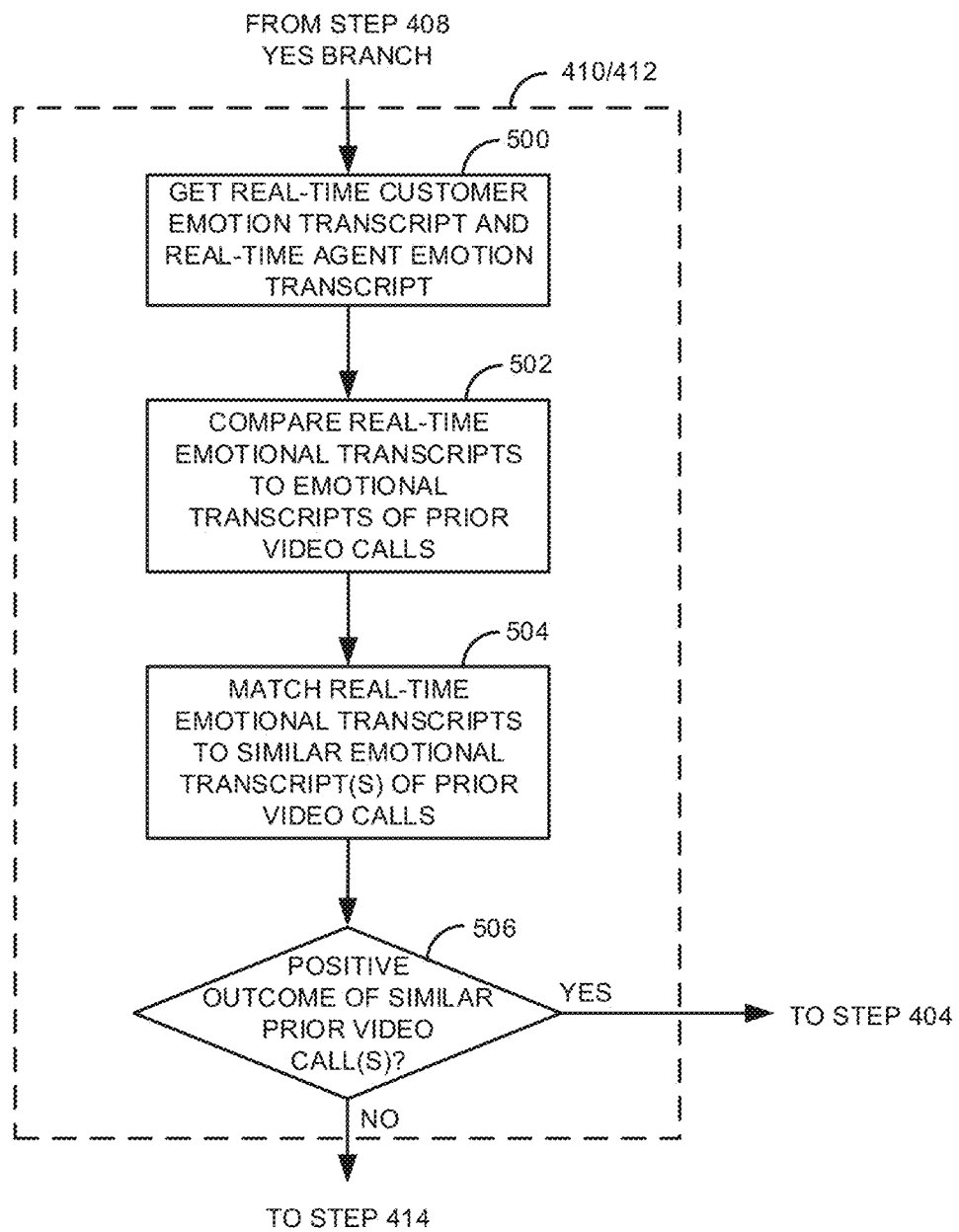
FIG. 5 is a flow diagram of a process for comparing real-time emotion transcripts to emotion transcripts of prior voice calls.

FIG. 5 is a flow diagram of a process for comparing real-time emotion transcripts 210/211 to emotion transcripts of prior voice calls. The process of FIG. 5 is an exemplary embodiment of steps 410/412 of FIG. 4. After determining if there is enough video to generate the real-time emotion transcripts in step 408, the video call management module 125 gets the real-time customer emotion transcript 210 and the real-time agent emotion transcript 211 in step 500. The video call management module 125 compares, in step 502, the real-time emotion transcripts 210/211 to emotion transcript(s) of prior video calls. The comparison of the real-time emotion transcripts 210/211 may compare only a portion of a prior video call and/or the real-time video call. For example, if the real-time video call is only three minutes long, the real-time emotion transcripts 210/211 may be compared to prior video calls that have a duration of more or less than three minutes.

The prior video calls may be with the same customer 105/same contact center agent 131, with the same customer 105/different contact center agent(s) 131, with a different customer(s) 105/same contact center agent 131, with different customer(s) 105/different contact center agent(s) 131, and/or the like. In addition, other factors, such as time (e.g., time of day, time of the week,), video call type (calls for a specific product), and/or the like may be factors used in the comparison of step 502.

The real-time emotion transcripts 210/211 are compared to identify matching emotional transcripts of prior video calls in step 504. For example the video call management module 125 can compare the real-time customer emotion transcript 210 and the real-time agent emotion transcript 211 of the video call to the last one hundred customer emotion transcripts/agent emotion transcripts of prior video calls in the contact center 120 to identify one or more previous video calls with similar characteristics. For example, the video call management module 125 may search through the last hundred prior video calls to see if there is a similar pattern to the real-time emotion transcripts 210/211.

The video call management module 125 determines, in step 506, the outcome of the similar prior video call(s). For example, if the video call management module 125 identified three out of the hundred prior video calls with that have similar customer emotion transcripts/agent emotion transcripts, the video call management module 125 then determines if the three prior video calls had a positive or negative outcome. The positive or negative outcome may be based on an average of the identified prior calls. The positive/negative outcome may be based on various factors, such as, taking a survey, a purchase of a product, not purchasing a product, the customer 105 hanging up, the customer 105 becoming angry, the video call taking longer than normal, the video call taking less time than normal, a supervisor assessment of the identified prior calls, and/or the like. For example, if each of the three identified prior video calls lasts three to four times longer than the average call time without the customer 105 purchasing a product, the outcome of those prior calls may be identified as a negative outcome according to the rules. If the outcome of the prior video call(s) was positive in step 506 (the real-time video call does not need to be managed differently), the process goes to step 404. Otherwise, if the outcome of the prior video call(s) is negative in step 506 (the real-time video call needs to be managed differently), the process goes to step 414.

The above processes are described in a contact center 120 environment. However, the above descriptions are not limited to a contact center 120 environment, but can be used for any video calls. For example, the emotion transcript may be used in a communication system that routes video calls to a user.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A first contact center comprising:
a microprocessor; and
a computer readable medium, coupled with the microprocessor and comprising microprocessor readable and executable instructions that, when executed by the microprocessor, cause the microprocessor to:
receive a video stream of a real-time video call between a communication endpoint of a customer and a first communication endpoint of a first contact center agent;
process, in real-time, the video stream of the real-time video call to generate a first real-time emotion transcript, wherein the first real-time emotion transcript tracks a plurality of separate emotions based on a plurality of non-verbal expressions that occur in the video stream of the real-time video call;
compare the first real-time emotion transcript to a second emotion transcript of at least one previous video call to determine if the real-time video call should be handled differently in the first contact center, wherein the comparison comprises determining at least one pattern in the first real-time emotion transcript and determining that one or more of the at least one pattern is similar to a pattern in the second emotion transcript; and
in response to determining that the real-time video call should be handled differently in the first contact center, determine an action to change, during the real-time video call, how the real-time video call is managed in the first contact center.

2. The first contact center of claim 1, wherein the plurality of non-verbal expressions comprise at least one micro-expression that cannot be visually detected by a human without the aid of the microprocessor.

3. The first contact center of claim 1, wherein the plurality of separate emotions are emotions of the customer and emotions of the first contact center agent.

4. The first contact center of claim 2, wherein a duration of one or more of the at least one micro-expression is about $\frac{1}{30}$ of a second.

5. The first contact center of claim 1, wherein the first real-time emotion transcript comprises a first real-time customer emotion transcript and a first real-time agent emotion transcript, wherein the second emotion transcript comprises a plurality of prior customer emotion transcripts and a plurality of prior agent emotion transcripts of a plurality of prior video calls, and wherein comparing the first real-time emotion transcript to the second emotion transcript comprises identifying at least one of the plurality of prior video calls that has a customer emotion transcript that is similar to the first real-time customer emotion transcript and an agent emotion transcript that is similar to the first real-time agent emotion transcript.

6. The first contact center of claim 1, wherein the first real-time emotion transcript comprises a first real-time customer emotion transcript of a customer, wherein the second emotion transcript comprises a second customer emotion transcript of the customer.

7. The first contact center of claim 1, wherein the first real-time emotion transcript and the second emotion transcript are transcripts associated with a specific type of real-time video call and wherein the specific type of real-time video call is associated with at least one of: a supported type of service provided by the first contact center, a contact center queue, a supported product, and a skill of an agent.

8. The first contact center of claim 1, wherein the first real-time emotion transcript comprises a first real-time customer emotion transcript and a first real-time agent emotion transcript that are combined to form a composite transcript.

9. The first contact center of claim 1, wherein the plurality of non-verbal expressions comprises at least one facial expression and at least one gesture that each occur in the video stream of the real-time video call.

10. The first contact center of claim 1, wherein the first real-time emotion transcript is a composite emotion transcript of all participants in the real-time video call and wherein the second emotion transcript is a composite emotion transcript of all participants in the at least one previous video call.

11. A method comprising:
receiving, by a microprocessor in a first contact center, a video stream of a real-time video call between a communication endpoint of a customer and a first communication endpoint of a first contact center agent;
processing, in real-time, by the microprocessor, the video stream of the real-time video call to generate a first real-time emotion transcript, wherein the first real-time emotion transcript tracks a plurality of separate emotions based on a plurality of non-verbal expressions that occur in the video stream of the real-time video call;
comparing, by the microprocessor, the first real-time emotion transcript to a second emotion transcript of at least one previous video call to determine if the real-time video call should be handled differently in the first contact center, wherein the comparing comprises determining at least one pattern in the first real-time emotion transcript and determining that one or more of the at least one pattern is similar to a pattern in the second emotion transcript; and
in response to determining that the real-time video call should be handled differently in the first contact center, determining, by the microprocessor and during the real-time video call, an action to change how the real-time video call is managed in the first contact center.

12. The method of claim 11, wherein the at least one pattern has at least a first emotion at a first level and at least a second emotion at a second level.

13. The method of claim 11, wherein the first real-time emotion transcript comprises a first real-time customer emotion transcript related to a type of service and/or product, wherein the second emotion transcript comprises a plurality of prior customer emotion transcripts of a plurality of prior video calls, and wherein comparing the first real-time emotion transcript to the second emotion transcript comprises identifying at least one of the plurality of prior video calls that has a customer emotion transcript that is similar to the first real-time customer emotion transcript and that is related to the type of service and/or product.

14. The method of claim 12, wherein the comparing comprises comparing the first level with a level of the first emotion in the second emotion transcript and comparing the second level with a level of the second emotion in the second emotion transcript.

15. The method of claim 11, wherein the comparing comprises determining a variance of at least one emotion in the first real-time emotion transcript.

16. The method of claim 11, wherein the comparing comprises determining a composite variance between at least two emotions in the first real-time emotion transcript.

17. A system comprising:
a microprocessor; and
a computer readable medium, coupled with the microprocessor and comprising microprocessor readable and executable instructions that, when executed by the microprocessor, cause the microprocessor to:
receive a video stream of a real-time video call between a first communication endpoint and a second communication endpoint;
process, in real-time, the video stream of the real-time video call to generate a first real-time emotion transcript, wherein the first real-time emotion transcript tracks a plurality of separate emotions based on a plurality of non-verbal expressions that occur in the video stream of the real-time video call;
comparing the first real-time emotion transcript to a second emotion transcript of at least one previous video call to determine, during the real-time video call, if the real-time video call should be handled differently, wherein the comparing comprises determining at least one pattern in the first real-time emotion transcript and determining that one or more of the at least one pattern is similar to a pattern in the second emotion transcript; and
in response to determining that the real-time video call should be handled differently, performing an action on the real-time video call.

18. The system of claim 17, wherein the first real-time emotion transcript is generated based on a machine learning algorithm trained to identify emotions based on at least two micro-expressions.

* * * * *